Patented Dec. 29, 1942

2,306,487

UNITED STATES PATENT OFFICE 2,306,487

ADHESIVE

James A. Mitchell, Kenmore, N. Y., assignor to E. I. du Pont de Nemours & Company, Wilmington, Del., a corporation of Delaware No Drawing. Application November 1, 1939, Serial No. 302,317

12 Claims. (Cl. 117—122)

This invention relates to adhesives, especially compositions having outstanding power to adhere to plain and moistureproofed regenerated cellulose sheet and like material. More particularly it appertains to adhesive compositions comprising essentially the thermoplastic material obtained by alkylating phenolic compounds with rubber.

If beta-naphthol is worked on a rubber mill (or in a Banbury mixer) with rubber and a small amount of a special catalyst, for example, di-hydroxy-fluoro-boric acid or sulfuric acid for about 15 minutes at about 100° C., there is obtained a material quite unlike rubber and the heretofore known rubber derivatives and isomers. The material sinks when placed in water, will not adhere to rubber, is more soluble in hydrocarbon solvents than rubber isomers, and when mixed with rubber on a mill and the mixture made into a thin cement, layers off.

It has now been discovered that this material which, for convenience, may be generically described as a phenol-modified rubber, is an excellent adhesive and adhesive base for water sensitive cellulosic film.

Recently there has appeared in commerce a transparent sheet wrapping material of regenerated cellulose. The manufacture of such a sheet material is described in U. S. A. Patent 1,548,864 (Brandenberger). A moistureproof variety of this wrapping material consisting of a base sheet of regenerated cellulose film coated with a moistureproofing coating composition, has also been offered to the trade. The application of the moistureproofing coating for the manufacture of the moistureproof variety is disclosed in U. S. A. Patents Nos. 1,737,187 (Charch & Prindle), 2,098,541 (Charch, Brubaker & Meigs) and 2,147,180 (Ubben). In the last mentioned patents moistureproofness, moistureproofing and moistureproof materials and expressions are defined, and the language in this application is in accord with those definitions. Great difficulty has been encountered in sealing the aforementioned wrapping materials, particularly the moistureproof variety. Vast research programs and expenditures in testing showed that materials commonly accepted as adhesives were useless in this field, and to date only a few materials which accomplish this purpose at all satisfactorily, have been discovered. The present discovery affords an excellent solution of the problem.

In the formation of envelopes, bags and various other articles from the moistureproofed regenerated cellulose sheet material, it is necessary, in order to preserve the moistureproofness of the article, that a good uniform adhesive contact be secured between the different portions of the article in its fabrication. This adhesive contact must be secured without destroying the moistureproof characteristics or substantially impairing the transparency at the place of adhesion. Ordinarily it is also essential that the adhesive used should not penetrate into the interior of the sheet to such an extent that it renders the coating on the opposite side of the sheet tacky, because if it does it may impair the moistureproof qualities of the article, and in addition cause it to stick to other articles with which it may come into contact. Such ends can be attained by employing the aforementioned phenol-modified rubber materials as adhesives.

The primary object of this invention was to provide an efficient adhesive for plain and moistureproofed regenerated cellulose sheet material. Other objects were to provide new adhesive compositions, to provide new adhesive materials of a transparent nature, and to provide strong adhesive bonds for smooth, non-fibrous, water-sensitive cellulosic materials. Still further objects were to devise new cementing processes; to produce new sealed articles; to provide adhesive compositions for moistureproofed regenerated cellulose sheet which set substantially immediately (this is almost a necessity in hand application); to provide adhesive compositions having little or no odor; to provide adhesive compositions free from stringing (this is especially important in machine operations); to provide adhesive compositions which were relatively stable and not susceptible to rapid chemical and physical changes upon aging (or exposure to atmospheric conditions); to produce substantially permanent, colorless, odorless and transparent joints; to provide adhesive joints not affected by the normal variations of humidity and/or temperature; to produce adhesive compositions which would not penetrate cellulosic film to the extent of causing the opposite side to become tacky; to produce film joints with adhesive compositions which do not weaken and/or deteriorate the film; to provide adhesives which promote and/or produce sufficient tackiness upon contact with regenerated cellulosic film to permit immediate adhesion with or without the application of heat (this is rather essential in hand sealing without heat); to provide adhesive compositions that do not corrode metals, machine parts, etc.; to provide adhesive compositions which dry quickly to form nontacky surfaces; and to produce adhesive compositions which adhere with great tenacity to smooth, glossy surfaces (it is preferable that adhesives for regenerated cellulose adhere to this type of surface with greater tenacity than to fibrous surfaces such as paper, wood, and the like). A general advance in the art, and other objects which will appear hereinafter, are also contemplated.

The present discovery accomplishes the aforementioned and other objects, and from the following description and specific examples, in which are disclosed certain embodiments of the invention as well as details of what is believed to be the best mode for carrying out the invention, it will be apparent how the foregoing objects and related ends are accomplished. Parts are given by weight throughout the specification.

EXAMPLE I

An adhesive composition consisting of:

| | Parts |
|---|---|
| Beta-naphthol-modified rubber (reacted with 17% beta-naphthol) | 4 |
| Chlorinated diphenyl (62% chlorine, plastic semi-solid sp. g. 1.646–1.653) | 4 |
| Chlorinated paraffin wax (35% chlorine) | 1 |
| Toluene | 14 | was prepared.

It was particularly useful as a pressure sensitive adhesive for sealing together two surfaces of regenerated cellulose film (either plain or moistureproofed), and was also satisfactory for laminating regenerated cellulose webs.

EXAMPLE II

An adhesive composition consisting of:

| | Parts |
|---|---|
| Beta-naphthol-modified rubber (containing 17% beta-naphthol) | 2 |
| Chlorinated diphenyl (plastic semi-solid, sp. g. 1.646–1.653, chlorine 62%) | 3 |
| Benzene | 7 | was prepared. This was a good laminating adhesive for laminating regenerated cellulose film to regenerated cellulose film and to paper. It was also especially suitable for adhering labels and the like to regenerated cellulose sheet.

EXAMPLE III

An adhesive composition consisting of:

| | Parts |
|---|---|
| Beta-naphthol-modified rubber (purified*) | 10 |
| Pale crepe rubber | 10 |
| Rosin | 18 |
| Chlorinated paraffin wax (35% chlorine) | 5 |
| Toluene | 100 |

*The naphthol modified rubber was purified by extracting all the free beta-naphthol from the reaction mixture with suitable solvents therefor.

was prepared. It was especially suited for the purposes listed in Example I.

EXAMPLE IV

An adhesive composition consisting of:

| | Parts |
|---|---|
| Beta-naphthol-modified rubber (purified) | 25 |
| Rosin | 18 |
| Chlorinated paraffin wax (35% chlorine) | 10 |
| Ethylene dichloride | 70 | was prepared. It was well adapted for sealing regenerated cellulose wrappings on packages (either moistureproofed or not), and for making bags from regenerated cellulose film (either plain or moistureproofed). It was also suitable for adhering labels to regenerated cellulose film (plain or moistureproofed).

EXAMPLE V

An adhesive composition consisting of:

| | Parts |
|---|---|
| Beta-naphthol-modified rubber (containing 17% beta-naphthol) | 25 |
| Rosin | 18 |
| Toluene | 70 | was prepared. It was particulary useful for lamminating regenerated cellulose film to paper.

EXAMPLE VI

An adhesive composition consisting of:

| | Parts |
|---|---|
| Beta-naphthol-modified rubber (purified) | 4 |
| Hydrogenated methyl abietate | 1 |
| Toluene | 7 | was prepared. It could be satisfactorily employed for laminating regenerated cellulose film to paper.

EXAMPLE VII

An adhesive composition consisting of:

| | Parts |
|---|---|
| Beta-naphthol-modified rubber (purified) | 5 |
| Benzene | 10 | was prepared. Among the uses of this composition, mention may be made of the laminating of plain regenerated cellulose web and paper.

EXAMPLE VIII

An adhesive composition consisting of:

| | Parts |
|---|---|
| Beta-naphthol-modified rubber (purified) | 25 |
| Rosin | 18 |
| Nevillite oil (equivalent of 35% chlorine chlorinated paraffin wax) | 10 |
| Ethylene dichloride | 70 | was prepared. It was well adapted for sealing regenerated cellulose wrappings on packages, for making bags from regenerated cellulose film, and was also suitable for adhering labels to regenerated cellulose film. In each case plain or moistureproofed sheet material could be used. Similar results were obtained with a composition consisting of purified phenol modified rubber, 20 parts, chlorinated diphenyl (62% Cl), 3 parts, and benzene, 7 parts.

EXAMPLE IX

An adhesive composition consisting of:

| | Parts |
|---|---|
| Beta-naphthol-modified rubber (purified) | 10 |
| Pale crepe rubber | 10 |
| Rosin | 18 |
| Nevillite oil | 5 |
| Toluene | 100 | was prepared. It was especially suited for the purposes listed in Example I.

EXAMPLE X

An adhesive composition consisting of:

| | Parts |
|---|---|
| Beta-naphthol-modified rubber (reacted with 17% beta-naphthol) | 4 |
| Chlorinated diphenyl (62% chlorine, plastic semi-solid sp. g. 1.646–1.653) | 4 |
| Nevillite oil (Neville Co., Pittsburgh, Pa.) | 1 |
| Toluene | 14 | was prepared. It was particularly useful as a pressure sensitive adhesive for sealing together two surfaces of regenerated cellulose film (either plain or moistureproofed), and was also satisfactory for laminating regenerated cellulose webs.

Carbolic acid (40 parts), rubber (100 parts) and di-hydroxy-fluoro-boric acid (4 parts) were used in preparing the alternative porduct of Examle VIII. The excess phenol was extracted with a solvent therefor before making up the adhesive composition. Twenty (20) parts of beta-naphthol and 4 parts of sulfuric acid were used in preparing the product of Examples I through X.

To seal, secure or join a material of the type herein described, such as for example, moistureproof regenerated cellulose sheeting, to itself or any other material, it is only necessary to apply the adhesive to at least one of the surfaces which are to be in contiguous and superimposed relationship. Subsequently, the materials are brought into proper position, and with the aid of pressure the materials are brought into intimate contact and the adhesives permitted to set. If desired, heat may be employed to accelerate and expedite the setting operation.

Variation in the proportions of the ingredients of the adhesive composition are, in general, permissible. Particularly satisfactory results have been obtained with adhesive compositions whose proportions fall within the ranges given in Table 1, following:

Table 1

| | |
|---|---|
| Phenol-modified rubber | 5 to 50 parts per 100 (preferably 10 to 25) |
| Resinous material (if used) | 0 to 30 parts per 100 (preferably 10 to 25) |
| Solvent (if used) | 10 to 80 parts per 100 |
| Plasticizer (if used) | 0 to 40 parts per 100 (preferably 5 to 25) |

The adhesive compositions may be applied as solutions or melts (with reduced amounts of, or without any solvent). In forming these solutions, solvents such as aliphatic and aromatic hydrocarbons are used. Chlorinated hydrocarbons are also suitable. Adhesive materials may also be prepared by emulsifying a hydrocarbon solution of the adhesive composition in water containing a wetting agent. A variety of wetting agents may be employed. The water soluble salts of alkyl sulfates in which the alkyl group contains more than 7 carbon atoms, are especially suitable. Organic liquids (solvents) such as acetone and ethylene glycol monomethyl ether, may be used in the same capacity. The presence of the ethylene glycol monomethyl ether is particularly desirable in adhesives for moistureproofed regenerated cellulose film where the presence of a solvent capable of softening the moistureproofing coating is desired. The moistureproofing coating compositions, it will be recalled, may be present on one or both sides of the regenerated cellulose sheet as a very thin coating, and generally comprise a film former (for example, a cellulose derivative such as cellulose nitrate), a moistureproofing agent (for example, a wax such as high melting paraffin wax), a gum (or resin), and a plasticizer. The term "solution" is used in a broad sense herein to include both true solutions and what may be termed "pseudo-solutions," which are in reality colloidal suspensions of the adhesive composition, including the phenol modified rubber.

To prevent oxidation and to insure stability of the adhesive composition (and joint), the presence therein of anti-oxidants may some times be desirable. Such compounds as benzyl-para-amino-phenol, catechol and the like, are preferred for this purpose. They are especially compatible with the ingredients of the adhesive materials of this invention, and may be incorporated satisfactorily in the various compositions, particularly the specific compositions of the examples. The amount of anti-oxidant varies with the different composition and the amount desired. Usually an amount in the range of .1% to 5% (usually 1%) based on the amount of the phenol-modified rubber, is sufficient.

Resins (natural, synthetic and semi-synthetic) may be incorporated in the adhesive compositions as augmenting agents. Such substances as rosin, hydrogenated rosin, hydrogenated rosin derivatives, ester gum, pitches, cumarone indene resins, alkyd resins, dammar, and the like, compound readily with the phenol-modified rubber and are preferred when a component of this character is desirable. One or more resins may be present in the adhesive composition, or the resin may be omitted.

Softeners or plasticizers may also be incorporated in the adhesive compositions. The preferred materials of this type are dibutyl phthalate, tricresyl phosphate, chlorinated paraffin, dixylyl ethane, hydrocarbon oils, and the like. One or more softeners may be present in the adhesive composition, or the softener may be omitted.

In case it is desired to change the appearance of the product dyes and pigments may also be incorporated in the adhesive composition.

The phenol-modified rubber prepared from 100 parts of rubber, 5 to 20 parts of beta-naphthol and 4 parts of concentrated sulfuric acid, constitutes the preferred material for employment in accordance with this invention. It is to be understood, however, that any of the products disclosed in U. S. A. Patent No. 2,158,530 (Williams) are satisfactory, and more than one may be employed in the same composition if desired. The crude product (containing excess phenolic material) may be used as produced. If desired, the reaction product may be purified by removing or rendering innocuous the excess phenolic material. Ordinary extraction is a convenient way of removing the phenolic material. After extraction, about 1% to about 5% by weight (based on the rubber) of the phenolic material remains. Treatment of the crude reaction product with formaldehyde causes the excess phenolic material to form a phenol-formaldehyde resin whose presence in the composition is not ordinarily objectionable. This resinous material does not exude or blush out as the free phenolic compound would.

The adhesive compositions of this invention have an application which is broader than the sealing of regenerated cellulose sheet material and moistureproofed regenerated cellulose sheet material. For example, the adhesives are applicable to articles formed of or containing cellulose acetate or cellulose nitrate, to plastics, to artificial leather, to photographic films, to novelties, and the like. The adhesives are also capable of use in joining various materials, such as paper, cardboard, cloth, metal foils, metal sheets and the like to regenerated cellulose and cellulose derivative surfaces. The adhesives of this invention are eminently suited for laminating purposes.

The adhesive compositions are particularly useful in the field of pressure sensitive adhesives. As anchoring agents they effect a more secure bond between a pressure sensitive adhesive of the "Scotch tape" type and regenerated cellulose film base. This application of the present invention is one of the most promising so far discovered. The Scotch tape (a recently developed product) ordinarily comprises a ribbon or tape of transparent or translucent regenerated cellulose having on the surface thereof a permanently tacky pressure sensitive adhesive. The uses of such a material are almost unlimited, although the employment as masking material and joining tape probably constitutes the largest volume of use. These and many other uses of the material involve repeated application and removal of the adhesive tape from the surface. For such a purpose it is highly desirable that the adhesive material adhere firmly to the base sheet, and in particular that it adhere more firmly to the base sheet than to the surface to which such a tape is applied. The anchoring effect of the compositions of this invention are especially notable in this respect. When the anchoring compositions of the present invention are employed, the adhesive material can be completely removed from the surface to which the tape has been applied, with the result that economies such as reuse of the tape and avoidance of cleaning the surface where the tape was applied, are possible. When such tapes are stripped from the surfaces to which they have been adhered, there remains a comparatively clean surface free from tackiness. The adhesive may be applied to the regenerated cellulose ribbon in the conventional manner, as for example, by means of doctor rolls or doctor knives (see U. S. A. Patent No. 2,084,878 to Van Cleef).

Whereas known adhesives impair and destroy one or more of the desirable characteristics of transparent regenerated film, very satisfactory results are obtained when phenol-modified rubber is employed as the adhesive material. Adhesive compositions of this invention are suitable for sealing smooth, non-porous, non-fibrous, cellulosic sheets or films such as those of regenerated cellulose, whether or not they contain a moistureproofing coating composition. They are also eminently suited for producing permanently tacky pressure sensitive adhesive tapes or anchoring other adhesives in the formation of permanently tacky pressure sensitive adhesive tapes and masking material when coated upon bases such as regenerated cellulose film.

By the expressions "pressure sensitive adhesive" and "normally pressure sensitive adhesive" is meant a material which can be caused to adhere to smooth regenerated cellulose sheet by pressure alone at ordinary normal room temperatures. Slight pressures, such as might be exerted by means of a thumb or finger, is contemplated in this definition.

The thickness of the adhesive layer in the "Scotch tape" type product usually falls within the range of 0.001 to 0.01 of an inch. Thicker layers may, of course, be used for special purposes.

The adhesion to smooth surfaces obtained with phenol-modified rubber is greatly superior to that obtained with rubber, rubber derivatives such as chlorinated rubbers, synthetic rubbers and their derivatives.

The term "phenol-modified rubber" as used throughout this application is intended to apply only to the type of material obtained according to U. S. A. Patent No. 2,158,530. It is not to be construed broadly enough to cover isomers or like derivatives of rubber which might be obtained by using phenol or phenol-sulfonic acid in a simple catalytic capacity. The materials of the present invention appear to be alkylated phenols in which rubber is the alkylating agent, and in which the phenol seems to be chemically combined to the rubber molecule (probably to what was an unsaturated carbon atom in the ordinary rubber).

Another advantage is that the adhesives of this invention do not have to be energized by a moistening agent. This is especially advantageous in the case of the pressure sensitive tapes.

As many apperently widely different embodiments of this invention may be made without departing from the spirit and scope thereof, it is to be understood that this invention is not limited to the specific embodiments thereof except as defined in the appended claims.

I claim:

1. A normally removable and reusable adhesive tape comprising essentially a film of regenerated cellulose having a thin coating of phenol-modified rubber plasticized with chlorinated paraffin wax thereon, said phenol modified rubber being a reaction product of rubber and one or more phenols prepared by milling 20 parts of the phenol and 4 parts of sulfuric acid with 100 parts of rubber until reaction is complete, and extracting the unreacted phenol from the resultant, said reaction product being a material which does not adhere to rubber, which is more soluble in hydrocarbon solvents than rubber isomers, which sinks when placed in water and which contains 1% to 5% of the phenol chemically combined with the rubber.

2. A normally removable and reusable adhesive tape comprising essentially a film of regenerated cellulose having a thin coating of pressure sensitive adhesive thereon, said adhesive layer being secured to the base film by means of phenol-modified rubber, said phenol modified rubber being a reaction product of rubber and a phenol which does not adhere to rubber, which is more soluble in hydrocarbon solvents than rubber isomers, which sinks when placed in water, and which contains 1% to 5% of the phenol chemically combined with the rubber.

3. A transparent, moistureproof joint comprising an adhesive bond and the materials joined thereby, one of the joined materials being a sheet of regenerated cellulose having a moistureproofing composition coating to which the bond is joined and the adhesive comprising essentially phenol-modified rubber, said phenol modified rubber being a reaction product of rubber and a phenol which does not adhere to rubber, which is more soluble in hydrocarbon solvents than rubber isomers, which sinks when placed in water, and which contains 1% to 5% of the phenol chemically combined with the rubber.

4. The article of claim 3 when both the materials joined by the adhesive are moistureproof sheet.

5. A package having a container of moistureproofed regenerated cellulose sheet wrapping material, the joints in the container being sealed with a phenol modified rubber adhesive composition, said phenol modified rubber being a reaction product of rubber and a phenol which does not adhere to rubber, which is more soluble in hydrocarbon solvents than rubber isomers, which sinks when placed in water, and which contains 1% to 5% of the phenol chemically combined with the rubber.

6. A normally removable and reusable adhesive tape comprising essentially a film of regenerated cellulose having a thin coating of

| | Parts |
|---|---|
| Beta-naphthol modified rubber | 4 |
| Chlorinated diphenyl | 4 |
| Chlorinated paraffin wax | 1 | thereon, said beta-naphthol modified rubber having been prepared by milling 20 parts of beta-naphthol and 4 parts of sulfuric acid with 100 parts of rubber until the reaction was complete, and extracting the unreacted beta-naphthol from the resultant, said reaction product being a material which does not adhere to rubber, which is more soluble in hydrocarbon solvents than rubber isomers, which sinks when placed in water and which contains 1% to 5% of the beta-naphthol chemically combined with the rubber.

7. A normally removable and reusable adhesive tape comprising essentially a film of regenerated cellulose having a thin coating of pressure sensitive adhesive thereon, said adhesive layer being secured to the base film by means of beta-naphthol modified rubber, said beta-naphthol modified rubber having been prepared by milling 20 parts of beta-napthol and 4 parts of sulfuric acid with 100 parts of rubber until the reaction was complete, and extracting the unreacted beta-naphthol from the resultant, said reaction product being a material which does not adhere to rubber, which is more soluble in hydrocarbon solvents than rubber isomers, which sinks when placed in water and which contains 1% to 5% of the beta-naphthol chemically combined with the rubber.

8. A normally removable and reusable adhesive tape comprising essentially a film of regenerated cellulose having a thin coating of beta-naphthol modified rubber plasticized with chlorinated paraffin wax thereon, said beta-naphthol modified rubber having been prepared by milling 20 parts of beta-naphthol and 4 parts of sulfuric acid with 100 parts of rubber until the reaction was complete, and extracting the unreacted beta-naphthol from the resultant, said reaction product being a material which does not adhere to rubber, which is more soluble in hydrocarbon solvents than rubber isomers, which sinks when placed in water and which contains 1% to 5% of the beta-naphthol chemically combined with the rubber.

9. A normally removable and reusable adhesive tape comprising essentially a film of regenerated cellulose having a thin coating consisting of

| | Parts |
|---|---|
| Beta-naphthol-modified rubber | 10 |
| Pale crepe rubber | 10 |
| Rosin | 18 |
| Chlorinated paraffin wax (35% chlorine) | 5 | thereon, said beta-naphthol modified rubber having been prepared by milling 20 parts of beta-naphthol and 4 parts of sulfuric acid with 100 parts of rubber until the reaction was complete, and extracting the unreacted beta-naphthol from the resultant, said reaction product being a material which does not adhere to rubber, which is more soluble in hydrocarbon solvents than rubber isomers, which sinks when placed in water and which contains 1% to 5% of the beta-naphthol chemically combined with the rubber.

10. A normally removable and reusable adhesive tape comprising essentially a film of regenerated cellulose having a thin coating consisting of

| | Parts |
|---|---|
| Beta-naphthol-modified rubber | 25 |
| Rosin | 18 |
| Chlorinated paraffin wax (35% chlorine) | 10 | thereon, said beta-naphthol modified rubber having been prepared by milling 20 parts of beta-naphthol and 4 parts of sulfuric acid with 100 parts of rubber until the reaction was complete, and extracting the unreacted beta-naphthol from the resultant, said reaction product being a material which does not adhere to rubber, which is more soluble in hydrocarbon solvents than rubber isomers, which sinks when placed in water and which contains 1% to 5% of the beta-naphthol chemically combined with the rubber.

11. A normally removable and reusable adhesive tape comprising a thin, flexible, non-fibrous cellulosic film, having a layer of pressure sensitive adhesive approximately 0.001 to 0.01 of an inch thick thereon, said adhesive comprising essentially 5 parts of chlorinated paraffin wax, 18 parts of rosin, 10 parts of pale crepe rubber and 10 parts of the material prepared by milling 20 parts of a phenol and 4 parts of sulfuric acid with 100 parts of rubber until reaction was complete, and extracting the unreacted phenol from the resultant, said reaction product being a material which does not adhere to rubber, which is more soluble in hydrocarbon solvents than rubber isomers, which sinks when placed in water and which contains 1% to 5% of the beta-naphthol chemically combined with the rubber.

12. A normally removable and reusable adhesive tape comprising a thin, flexible, non-fibrous cellulosic film, having a layer of pressure sensitive adhesive approximately 0.001 to 0.01 of an inch thick thereon, said adhesive comprising essentially 5 parts of chlorinated paraffin wax, 18 parts of rosin, 10 parts of pale crepe rubber and 10 parts of the material prepared by milling 20 parts of beta-naphthol and 4 parts of sulfuric acid with 100 parts of rubber until reaction was complete, and extracting the unreacted beta-naphthol from the resultant, said reaction product being a material which does not adhere to rubber, which is more soluble in hydrocarbon solvents than rubber isomers, which sinks when the beta-naphthol chemically combined with placed in water and which contains 1% to 5% of the rubber.

JAMES A. MITCHELL.

CERTIFICATE OF CORRECTION.

Patent No. 2,306,487. December 29, 1942.

JAMES A. MITCHELL.

It is hereby certified that error appears in the printed specification of the above numbered patent requiring correction as follows: Page 3, first column, line 6-7, for "porduct of Examle" read --product of Example--; and second column, line 20, for "dammar" read --damar--; page 5, second column, line 62, claim 12, strike out "placed in water and which contains 1% to 5% of" and insert the same after "when" in line 60, same claim; and that the said Letters Patent should be read with this correction therein that the same may conform to the record of the case in the Patent Office.

Signed and sealed this 9th day of February, A. D. 1943.

(Seal)

Henry Van Arsdale,
Acting Commissioner of Patents.